United States Patent
Howard et al.

(10) Patent No.: US 6,745,285 B2
(45) Date of Patent: Jun. 1, 2004

(54) SYSTEM AND METHOD FOR SYNCHRONIZING MIRRORED AND STRIPED DISK WRITES

(75) Inventors: John H. Howard, Cambridge, MA (US); David Robinson, Santa Clara, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 587 days.

(21) Appl. No.: 09/740,541

(22) Filed: Dec. 18, 2000

(65) Prior Publication Data

US 2002/0078315 A1 Jun. 20, 2002

(51) Int. Cl.[7] ............... G06F 12/00; G06F 11/10
(52) U.S. Cl. ............... 711/114; 711/100; 711/162
(58) Field of Search ............ 709/203; 711/114, 711/162, 100, 112, 113, 148

(56) References Cited

U.S. PATENT DOCUMENTS

| | | | | |
|---|---|---|---|---|
| 5,537,319 A | * | 7/1996 | Schoen | 702/14 |
| 5,550,975 A | | 8/1996 | Ichinomiya et al. | |
| 5,555,371 A | | 9/1996 | Duyanovich et al. | |
| 5,713,017 A | | 1/1998 | Lin et al. | |
| 5,819,109 A | * | 10/1998 | Davis | 710/15 |
| 5,859,965 A | * | 1/1999 | Gittins et al. | 714/52 |
| 6,073,218 A | | 6/2000 | DeKoning et al. | |
| 6,112,255 A | * | 8/2000 | Dunn et al. | 710/7 |
| 6,321,298 B1 | * | 11/2001 | Hubis | 711/124 |
| 6,349,359 B1 | * | 2/2002 | Gittins et al. | 711/114 |
| 6,460,122 B1 | * | 10/2002 | Otterness et al. | 711/154 |

OTHER PUBLICATIONS

"Storage Area Networking," ©2000 VERITAS Software, pp.1–4.
International search report application No. PCT/US01/48613 mailed Dec. 13, 2002.

* cited by examiner

*Primary Examiner*—Tuan V. Thai
(74) *Attorney, Agent, or Firm*—Meyertons Hood Kivlin Kowert & Goetzel, P.C.; B. Noël Kivlin; Stephen J. Curran

(57) ABSTRACT

A system and method for synchronizing mirrored and striped disk writes. A data storage system may include a client computer system coupled to a first data storage device and a second data storage device and configured to transmit a first data write request. The first storage device may be configured to transmit a sequence number to the client computer system in response to receiving the first data write request. The client computer system may be further configured to transmit a second data write request including the sequence number to the second storage device. The second data storage device may include a counter and is configured to compare a current counter value to the sequence number. If the counter value is equal to the sequence number, the second storage device stores the data bytes corresponding to the second data write request and increments its counter.

32 Claims, 4 Drawing Sheets

SYSTEM AND METHOD FOR SYNCHRONIZING MIRRORED AND STRIPED DISK WRITES

BACKGROUND OF THE INVENTION

1. Field of the Invention

This invention relates to computer storage systems and, more particularly, to data mirroring and striping.

2. Description of the Related Art

In most cases, computer systems require data storage in one form or another. One type of computer system is a stand-alone system such as, for example, a single workstation running applications and storing data to files on a single disk drive or multiple disk drives that are directly connected to it. In such an environment, the workstation may use a local file system.

Frequently however, computer systems are deployed in a networked environment. In the networked environment, one or more client computer systems running user applications may be connected to one or more file servers which provide networked access to files used by the applications. Such a networked environment is referred to as a distributed file system.

An important feature of distributed file systems is high reliability of the file system. More particularly, it is important that the file system be as immune as possible to any system failures (crashes, power failures, etc.). If a system failure occurs, a less reliable file system may experience file corruption (e.g. if the failure occurred while the file was in the process of being updated). Repairing file corruption may be a complex and time consuming process, and may result in the loss of data. The lost data may result in a subsequent loss of productivity for the user who updated the file, and may even result in permanent loss if the lost data cannot be easily recreated by the user.

In addition to file system reliability, the access speed of the network data storage system is also important. To obtain storage system reliability, data mirroring is a well-known method. To increase system performance, data striping is a well-known method. Both of these methods are described in various literature pertaining to redundant arrays of inexpensive disks (RAID) architectures. Although mirroring does provide high reliability and striping does provide high performance, there are data coherency issues that must be addressed.

A problem may arise when two or more client computers are accessing the same mirrored device. It is possible that the writes to the mirror get processed out of order, thereby possibly causing inconsistencies in the stored data and the mirrored data. Likewise, when striping data across a disk array, it is possible for data writes from different clients to become interleaved, thereby possibly causing inconsistent data.

One solution to the above problems is to use a technique known as locking. Locking generally refers to allowing access to data by only one client at a time. In many applications, locking works. However, it may be a complex function when trying to recover data. Locking may also contain system access time overhead due to extra messages being sent across the network. Therefore, a data coherency solution other than locking is desirable.

SUMMARY OF THE INVENTION

Various embodiments of a data storage system for synchronizing mirrored and striped data writes are disclosed. In one embodiment, the data storage system includes a client computer system coupled to a first data storage device and a second data storage device and configured to transmit a first data write request. The first storage device is configured to transmit a sequence number to the client computer system in response to receiving the first data write request. The client computer system is further configured to transmit a second data write request including the sequence number to the second storage device.

In one particular implementation, the second data storage device may include a counter and is configured to compare a current counter value from the counter to the sequence number. If the current counter value is equal to the sequence number, the second storage device stores the data bytes corresponding to the second data write request and increments the counter. If the received sequence number is smaller, it is out of sequence and the second storage device may discard the data write request. If the received sequence number is larger, it is considered out of sequence and premature. The second storage device may store the data bytes, and store the data byte range and sequence number of the premature data write request in a record.

In other implementations, the second storage device may be configured to transmit the current counter value to the client computer system in response to storing the data bytes corresponding to the second data write request.

Figure 1:
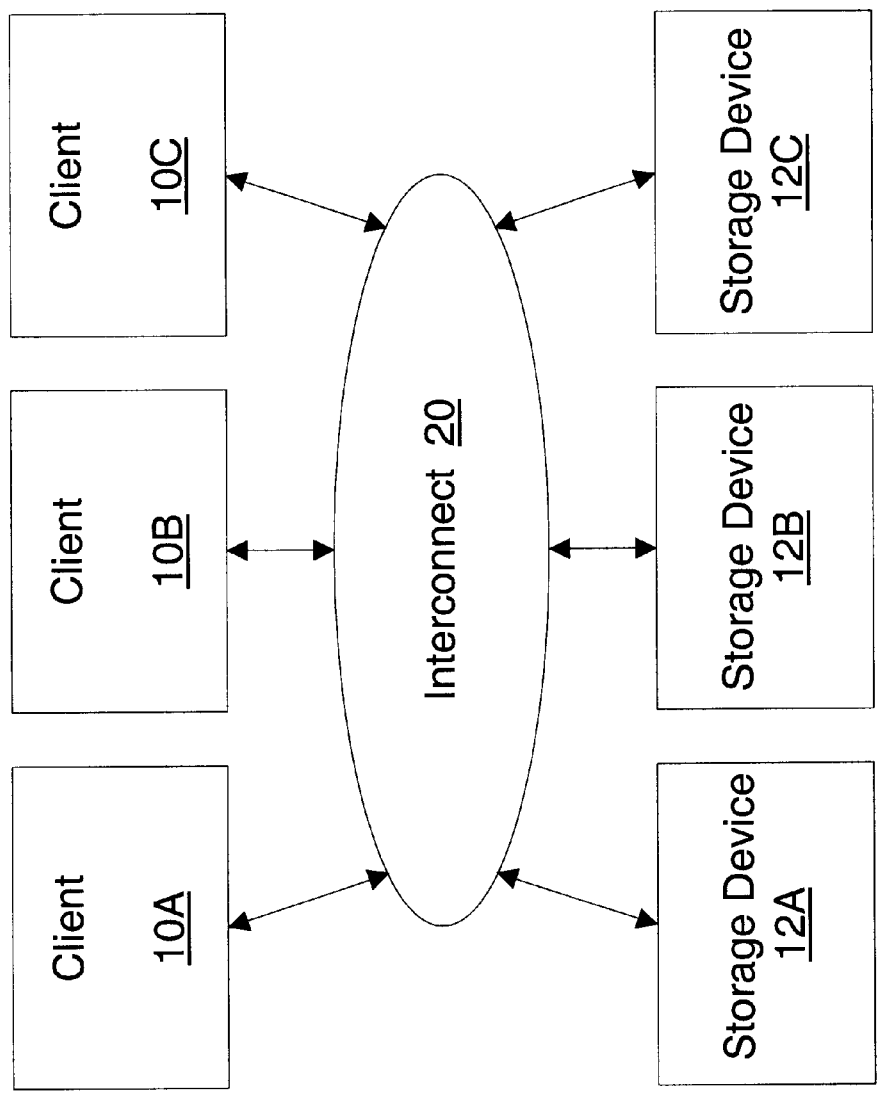
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Referring now to FIG. 1, a block diagram of one embodiment of a computer system is shown. The computer system includes a plurality of clients 10A–10C and a plurality of storage devices 12A–12C, which are coupled to clients 10A–10C through an interconnect 20.

Generally, each of clients 10A–10C may be a computing node. A computing node may comprise one or more computer systems operating in concert to perform a computing operation. A computer system may be a collection of: (i) one or more processors, interface circuitry, disk drives, network adapters, and other I/O devices; and (ii) an operating system and other applications which operate together to performing a designated computing function. Each computer system may be housed in a separate housing from other computer systems and may have a connection to interconnect 20. Alternatively, each of clients 10A–10C may be a stand-alone workstation or personal computer. Although the illustrated embodiment shows three clients and three storage devices, it is contemplated that there may be any number of clients 10A–10C and storage devices 12A–12C, as desired.

Storage devices 12A–12C may include any form of non-volatile computer readable medium. For example, storages 12A–12C may each include one or more fixed or removable disk drives, tape drives, CD-ROMs, writeable CD-ROMs, etc.

Interconnect 20 may be a high bandwidth, low latency interconnect. For example, in one embodiment, interconnect 20 may be compatible with the Infiniband specification available from the Infiniband Trade Association. In other embodiments, interconnect 20 may be compatible with other specifications.

Generally, clients 10A–10C execute user applications that operate upon files stored on storage devices 12A–12C. As will be described in greater detail below, clients 10A–10C may read data from and write data to storage devices 12A–12C. Storage devices 12A–12C may be configured to provide data mirroring or data striping or a combination of both. It will be further described how storage devices 12A–12C may keep track of the read and write requests made by a client such as client 10A during such operations as data mirroring or data striping.

Figure 2:
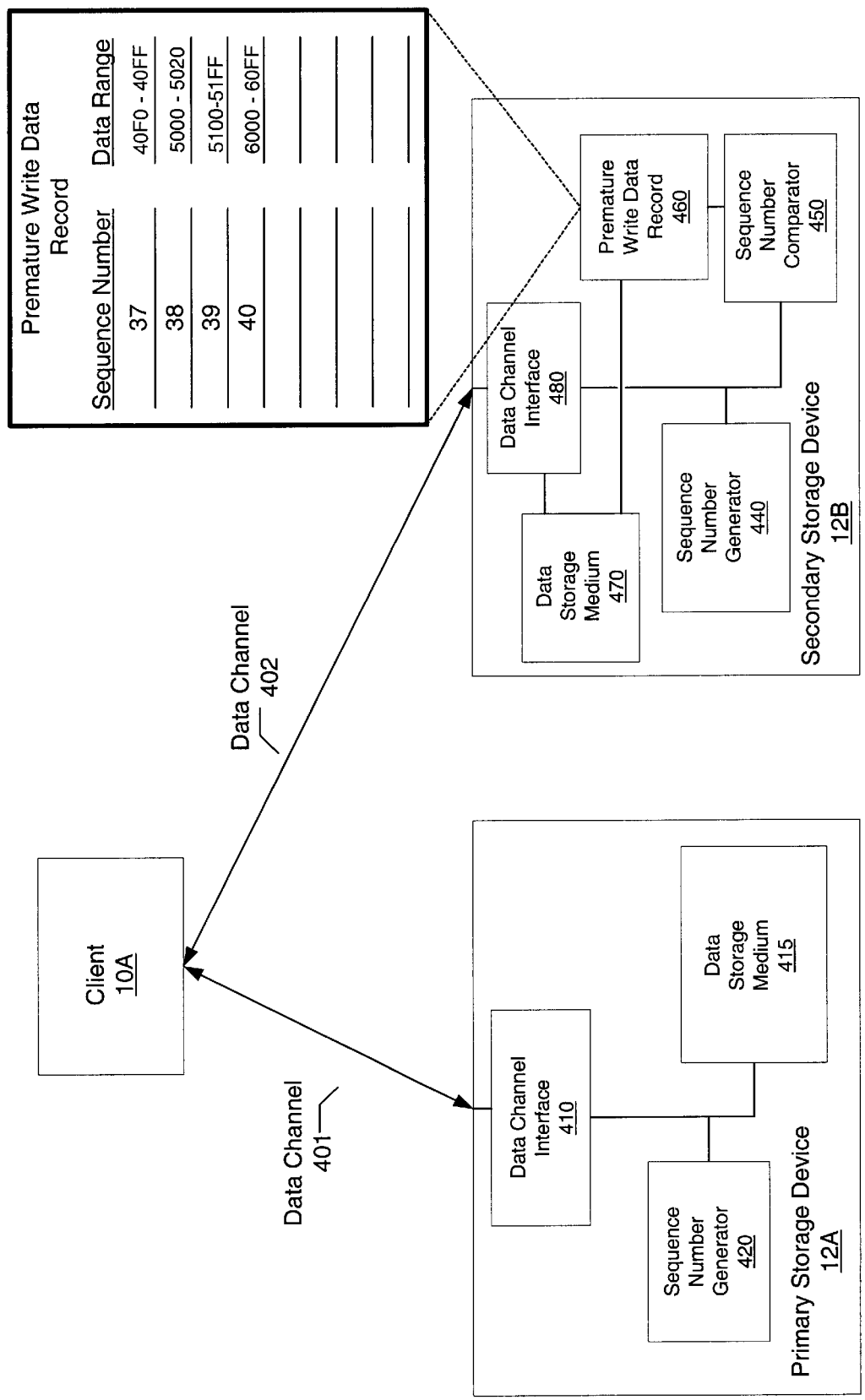
FIG. 2 is a block diagram depicting the operation of one embodiment of a data storage system associated with the computer system of FIG. 1.

Turning to FIG. 2, a block diagram depicting the operation of particular aspects of one embodiment of the computer system of FIG. 1 is shown. Diagram components that correspond to those shown in FIG. 1 are numbered identically for simplicity and clarity. The data storage system of FIG. 2 includes a client computer system 10A coupled to both a primary data storage device 12A and a secondary data storage device 12B through data channel 401 and data channel 402, respectively. In this embodiment, data channels 401 and 402 are depicted as direct connections from client 10A to primary data storage device 12A and secondary data storage device 12B. However, it is noted that in other embodiments, client 10A may be connected to primary data storage device 12A and secondary data storage device 12B through some other form of interconnect such as, for example, interconnect 20 of FIG. 1. It is also noted that client 10A of FIG. 2 is only representative of other client computers such as clients 10B–C and that client 10A is shown only as an example.

Primary storage device 12A may include a data channel interface 410 which is coupled to a sequence number generator 420 and a data storage medium 415. Secondary data storage device 12B may include a data channel interface 480 which is coupled to a sequence number generator 440 and a data storage medium 470. Secondary data storage device 12B may also include a sequence number comparator 450. It is noted that while storage device 12A is shown as a primary storage device and storage device 12B is shown as a secondary storage device, the storage devices may contain identical circuitry and software and may therefore be interchanged, as long as one storage device is designated as a primary storage device. They are illustrated as shown in FIG. 2 for ease and clarity of describing the operation of the system.

Storage devices 12A and 12B may be configured in a mirroring configuration or a striping configuration. In a system that employs both data striping and mirroring, more storage devices are necessary, since the data would be striped across two or more storage devices and the data would then be mirrored on an equal number of storage devices for redundancy.

When data mirroring is enabled, any data written to primary storage device 12A would also be written to secondary storage device 12B. When data striping is enabled, the data would be broken up into predetermined blocks and written across both primary storage device 12A and secondary storage device 12B.

In the illustrated embodiment, when data must be saved in a mirrored data configuration, client 10A transmits a write data request to primary storage device 12A through data channel 401. Primary storage device 12A receives the write data request at data channel interface 410, where the data is routed to data storage medium 415 for storage. Once the data is stored, data storage medium 415 causes sequence number generator 420 to provide a current sequence number to data channel interface 401. Sequence number generator 420 may include a counter and a register to keep track of the current sequence number. Although described as an up counter, it is contemplated that the counter may be either an up counter or a down counter, in which case the counter would be decremented instead of incremented. Data channel interface 401 then transmits a write data status message including the sequence number to client 10A. Once the write data status message is transmitted, data channel interface 401 causes sequence number generator 420 to increment to the next sequence number.

Upon receiving the write data status message, client 10A generates a second write data request. Client 10A is configured to include the sequence number received from primary storage device 12A in the second write data request. Client 10A transmits the second write data request to secondary storage device 12B through data channel 402.

Secondary storage device 12B receives the write data request at data channel interface 480. Data channel interface 480 causes sequence number generator 440 to provide a current sequence number to sequence number comparator 450. Sequence number generator 440 may include a counter and a register to keep track of the current sequence number. Although described as an up counter, it is contemplated that the counter may be either an up counter or a down counter, in which case the counter would be decremented instead of incremented. Additionally, if the counter portion of sequence number generator 440 is a down counter, then the relationship between the current sequence number and the sequence number received from client computer 10A would be the inverse of the description below. Sequence number comparator 450 compares the current sequence number generated by sequence number generator 440 with the sequence number included in the write data request received by data channel interface 480. If the two sequence numbers are equal, then sequence number comparator 450 causes data channel interface 480 to provide the data to data storage medium 470 for storage. Once the data is stored to data storage medium 470, data channel interface 480 transmits a write data status message to client 10A including the sequence number of the current write data request. Data channel interface 480 subsequently causes sequence number generator 440 to increment to the next sequence number.

If the sequence number received from client 10A is smaller than the current sequence number generated by sequence number generator 440, then the second write data request received from client 10A is discarded by secondary storage device 12B and an error message is transmitted by secondary storage device 12B.

If the sequence number received from client 10A is larger than the current sequence number generated by sequence number generator 440, then sequence number comparator 450 causes data channel interface 480 to provide the data to data storage medium 470 for storage. However, since the larger sequence number indicates a premature write data request, a premature write data record 460 is created. As illustrated in the exploded view of premature write data record 460, the premature write data request sequence number and the data range of each premature write data request are recorded. As subsequent write data requests are received by data channel interface 480, the corresponding sequence numbers and data ranges are compared to the sequence numbers and data ranges in premature write data record 460. Any data in a subsequent write data request that overlaps data in a premature write with a larger sequence number is discarded, while the non-overlapping data is stored. When the write data request is received that has the same sequence number as the current sequence number, any non-overlapping data is stored and the sequence number generator is incremented. When sequence number generator 440 increments to a sequence number that equals a sequence number in premature write data record 460, the data record entry containing that sequence number is discarded and sequence number generator 440 is incremented to the next sequence number until a sequence number is reached that is not in premature write data request record 460. In each case, if data is stored to data storage medium 470, data channel interface 480 transmits a write data status message including the sequence number of the current write data request to client 10A. It is noted that premature write record 460 may be implemented in various ways such as a table, a linked list, etc.

When client 10A transmits a read data request to any storage device, such as primary storage device 12A, data channel interface 410 receives the read data request and causes the requested data to be retrieved from data storage medium 415. Data channel interface 410 also retrieves the most current sequence number from sequence number generator 420. Data channel interface 410 transmits the requested data and the current sequence number to client 10A. Client 10A compares the sequence number received with the previous sequence number received in a previous read data request. If client 10A generates two consecutive read data requests to primary storage device 12A, the sequence numbers that client 10A receives must necessarily be non-decreasing. If however, client 10A generates a read data request to primary storage device 12A and then a subsequent read data request to secondary storage device 12B, there is a possibility that the sequence numbers returned may be different. If client 10A receives a decreasing sequence number, then client 10A generates a second read data request to secondary storage device 12B. Client 10A may retry read data requests to secondary storage device 12B until the correct sequence number is returned by secondary storage device 12B or a predetermined number of retries or a time limit is exceeded. Once a limit is exceeded, in a data storage system where more than one storage device such as secondary storage device is present, client 10A may retry a read data request to another secondary storage device to ensure that the correct sequence number and corresponding data is returned.

If client 10A fails, it is possible to permanently lose a mirrored write. To recover from such a loss, a replacement client may query primary storage device 12A for the current sequence number without incrementing the current sequence number. This would allow a replacement client to copy an entire file from primary storage device 12A to secondary storage device 12B with the correct sequence number.

The embodiment shown in FIG. 2 may also be used when primary storage device 12A and secondary storage device 12B are configured in a data striping configuration. As described above, in a data striping configuration, the data is broken up into blocks and distributed across the available storage devices. As described further below, data write operations to the storage devices are handled similar to data write operations in a mirrored configuration.

In this embodiment, client 10A may provide software control over the data striping, such that client 10A determines which storage devices will receive which blocks of data. Although the data is broken into blocks to be distributed across the available storage devices, one of the storage devices must be designated as a primary storage device. In this embodiment, storage device 12A is the primary storage device, although in other embodiments any storage device may be designated as the primary storage device. Therefore, a first write data request must be transmitted to primary storage device 12A to obtain a sequence number. The remaining write data requests may be transmitted to any remaining storage devices in the network data storage system in order to achieve data striping. In data striping configurations, there may be data stripes that do not have enough blocks to write to all of the storage devices. However, in order to maintain sequence number coherency, there may be write data requests which contain zero data bytes. In such cases, a write data request containing zero data bytes is transmitted to increment the sequence number generator of the respective data storage device to the next sequence number.

Figure 3:
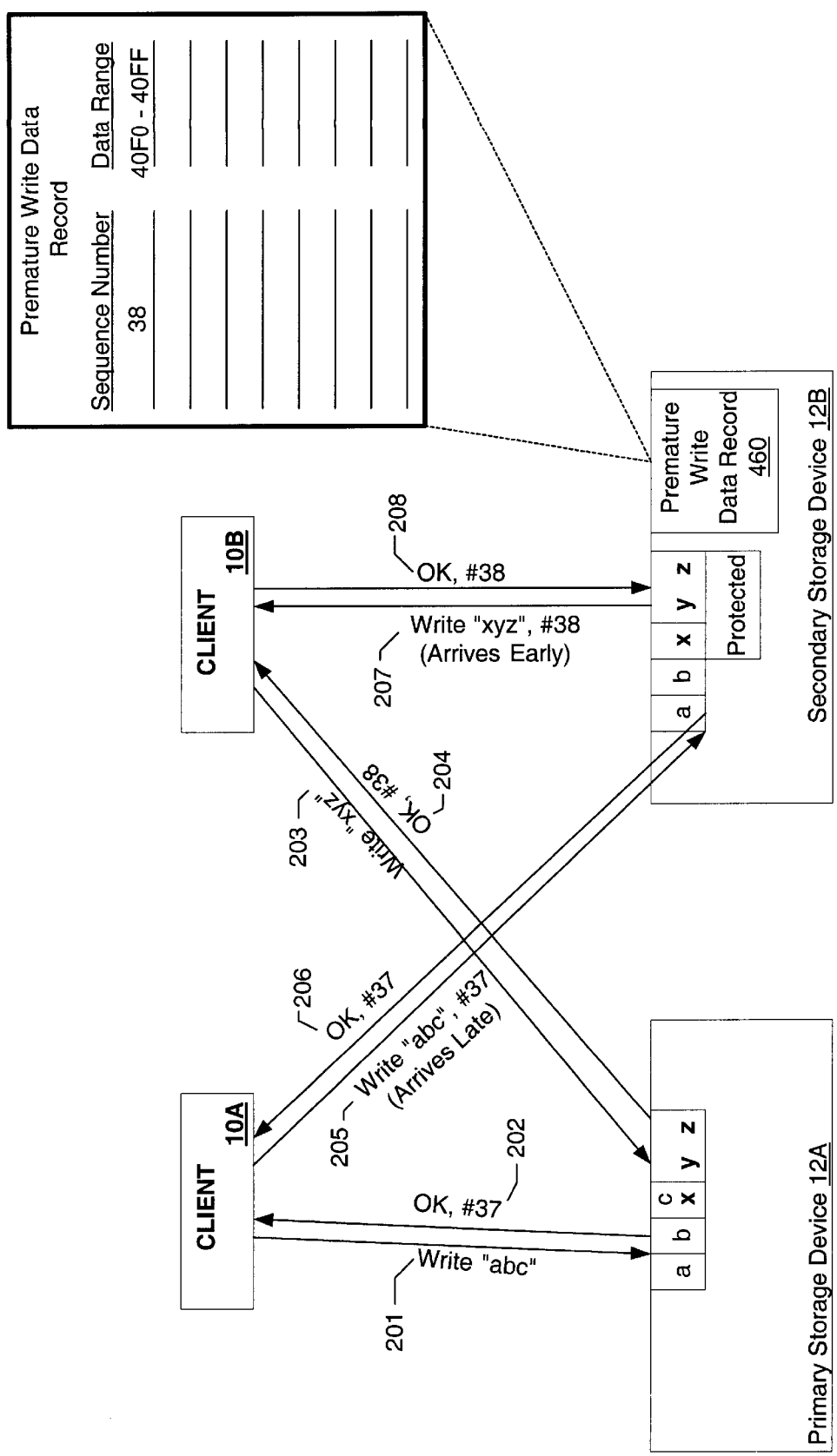
FIG. 3 is a block diagram depicting the operation of one embodiment the data storage system of FIG. 2 during an out of sequence write.

Referring to FIG. 3, a block diagram depicting the operation of one embodiment the data storage system of FIG. 2 during an out of sequence write is shown. Diagram components that correspond to those shown in FIG. 1 and FIG. 2 are numbered identically for clarity and simplicity. A Client 10A is coupled to a primary storage device 12A and a secondary storage device 12B. Client 10B is likewise coupled to primary storage device 12A and secondary storage device 12B.

Client 10A transmits a write data request 201 to primary storage 12A. Primary storage device 12A stores the data, which in this example is 'abc', and assigns a sequence number, in this example sequence number '37', to the write operation. Sequence number '36' is assumed in this example to have already been assigned to a previous write data request. Primary storage device 12A then returns a write data status message 202 to client 10A including sequence number '37'. Client 10B transmits a write data request 203 to primary storage device 12A. Primary storage device 12A stores the data, which in this example is 'xyz', and assigns the next sequential sequence number '38', to the write operation. As illustrated in FIG. 3, some of the data 'xyz' overlaps the data 'abc' from the previous write. Primary storage device 12A then returns a write data status message 204 to client 10B including sequence number '38'. Client 10A and client 10B both attempt to transmit write data requests to secondary storage device 12B. However due to network factors, such as for example, network switching latencies, system locations and differing client processor speeds, a write data request 207 is transmitted to and received by secondary storage device 12B before a write data request 205.

As described above in the description of FIG. 2, write data requests to secondary storage device 12B include the sequence numbers that were returned in the write data status messages from primary storage device 12A. Secondary storage device 12B receives write data request 207 and stores the data 'xyz'. Then, upon determining that sequence number '38' is out of sequence and therefore write data request 207 is a premature write, secondary storage device 12B generates an entry for a premature write data record 260. The entry for sequence number '38' is illustrated in the exploded view of premature write data record 260. The sequence number and data range of the corresponding data are recorded. Secondary storage device 12B returns a write data status message 208 to client 10A including sequence number '38'.

Secondary storage device 12B then receives write data request 205 including sequence number '37'. Secondary storage device 12B compares sequence number '37' and the data range of write data request 205 to the entry in premature write data record 260. Since sequence number '37' is smaller, and the data ranges overlap, the data that does not overlap is stored in secondary storage device 12B. The data in write data request containing sequence number '37' that overlaps the data in the data range of sequence number '38' is discarded. Secondary storage device 12B returns a write data status message including sequence number '37' to client 10A. Since the write data request that contains sequence number '37' is the current sequence number and premature write data record contains sequence number '38', the sequence number generator 440 described above in FIG. 2 increments past sequence number '38' to sequence number '39'. The entry in premature write data record 260 containing sequence number '38' is then deleted. The data storage system described above may advantageously synchronize mirrored and striped data written to different storage devices.

Figure 4:
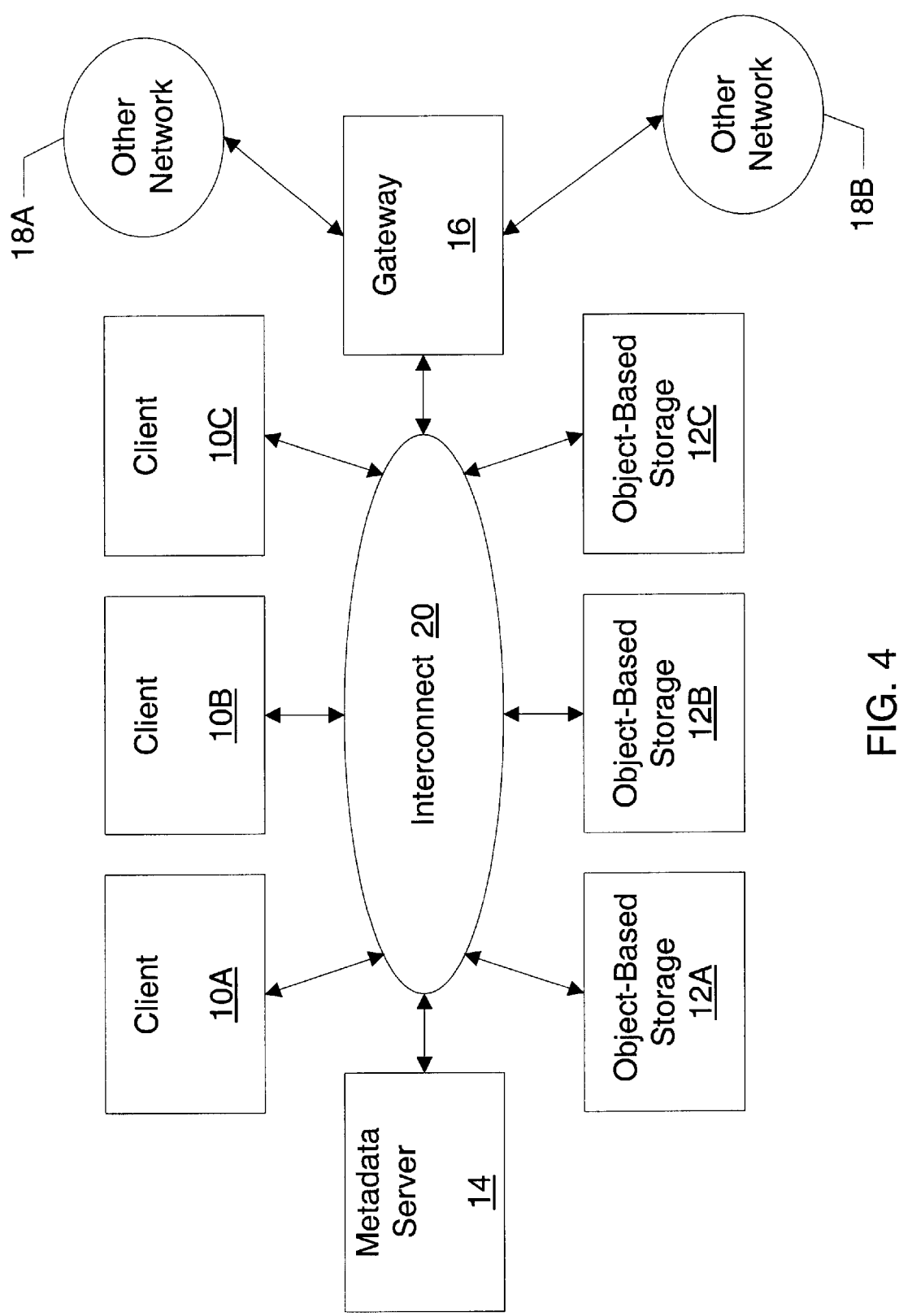
FIG. 4 is a block diagram of one embodiment of a networked computer system.

Referring now to FIG. 4, a block diagram of one embodiment of a networked computer system is illustrated. The networked computer system includes a plurality of clients 10A–10C, a plurality of object-based storages 12A–12C, a metadata server 14, a gateway 16, and other networks 18A–18B. Each of the clients and storages are configured to implement the functionality as described above in conjunction with FIG. 2 and FIG. 3. In FIG. 4, clients 10A–10C, storages 12A–12C, metadata server 14, and gateway 16 are connected via an interconnect 20. In various embodiments, metadata server 14 may be replicated for reliability and/or performance or may be implemented as software components in other nodes.

Generally, clients 10A–10C execute user applications that operate upon files stored on storages 12A–12C. A client 10A–10C may open a file by transmitting an open command to metadata server 14, which maps the file name used by the application to: (i) a file identifier (file ID) identifying the file to the storage 12A–12C storing the file; and (ii) a device identifier (device ID) identifying which storage 12A–12C stores the file. The metadata server 14 provides this information to the requesting client 10A–10C in response to the open command. The requesting client 10A–10C then performs various read and write commands directly to the storage 12A–12C identified by the device ID. Finally, the requesting client 10A–10C may perform a close command to the storage 12A–12C when the requesting client 10A–10C is finished accessing the file.

Object-based storage 12A–12C stores variable-sized objects instead of blocks. Each object is zero or more bytes, and a given object may be of an arbitrary length. For example, a file may be an object. Alternatively, a file may comprise two or more objects. The storage medium within object-based storage 12A–12C may still employ blocks, and in such an embodiment the object-based storage 12A–12C may perform the function of mapping files to blocks. As used herein, a block is a fixed-sized unit of storage space which is the smallest unit of allocation of space within the storage. Blocks may be of various sizes. For example, 4 kilobytes may be a suitable block size. Since the storage performs the block mapping function, access to the storage may be on an object basis (e.g. a file or a portion of a file) instead of a block basis. For example, a client 10A–10C may write one or more bytes to a file by transmitting a write command to the storage 12A–12C storing the file. The write command may include the file ID and the data to be written. The storage 12A–12C may handle merging the written bytes with the other data within the block. Previously, merging of writes into data blocks was performed by the client 10A–10C (by reading the affected block from the storage, updating the affected block locally in the client, and writing the affected block back to the storage). Similarly, a client 10A–10C may read one or more bytes from a file by transmitting a read command to the storage 12A–12C storing the file. The read command may include the file ID and the number of bytes to be read. Accordingly, the amount of data transmitted between the client and the storage may be reduced. Furthermore, client locking of blocks during updating may be eliminated.

Interconnect 20 may be a high bandwidth, low latency interconnect. For example, in one embodiment, interconnect 20 may be compatible with the Infiniband specification available from the Infiniband Trade Association. The Infiniband interconnect is based on switched serial links to device groups and devices. In other words, these devices or device groups may be connected with serial links either directly or through a switch. Devices on an InfiniBand network may be connected through switches and routers to several hosts. Each switch may operate a specific subnetwork of directly attached devices, while routers may interconnect several switches. InfiniBand devices may thus be connected in a fabric. Infiniband may use either packet or connection-based methods to communicate messages. Messages may include read or write operations, channel send or receive messages, atomic operations, or multicast operations. It is noted however, that any interconnect having low latency may be used, including a variety of intranet or Internet interconnects such as Fibre Channel or Ethernet. For example, Infiniband may provide typical latencies from 1 to 100 microseconds.

Since clients directly access storage using a low latency interconnect, caching of file data on clients may be unnecessary. The low latency of the interconnect 20 may allow rapid access to file data, and the object-based nature of the storages 12A–12C may allow for relatively small amounts of data to be transferred for each request (e.g. less than a block). Accordingly, the complexities of client data caching may be eliminated.

Generally, each of clients 10A–10C and metadata server 14 may be a computing node. A computing node may comprise one or more computer systems operating in concert to perform a computing operation. A computer system may be a collection of: (i) one or more processors, interface circuitry, disk drives, network adapters, and other I/O devices; and (ii) an operating system and other applications which operate together to performing a designated computing function. Each computer system may be housed in a separate housing from other computer systems and may have a connection to interconnect 20.

Metadata server 14 stores file metadata. Among other things, the metadata stored by metadata server 14 may include the directory structures of the file systems within the networked computing environment shown in FIG. 1. The directory structures map a file name (which is a string of characters naming the file in a human-readable fashion) to a file ID (which is used to locate the file on the storage device, and may be a number having meaning only to the storage device storing the file). It is noted that there may be any number of metadata servers 14, as desired. Similarly, there may be any number of clients 10A–10C and storages 12A–12C, as desired.

Although the above embodiment describes object-based storages 12A–12C, it is contemplated that storages 12A–12C may include any form of non-volatile computer readable medium. For example, storages 12A–12C may each include one or more fixed or removable disk drives, tape drives, CD-ROMs, writeable CD-ROMs, etc. Additionally, storages 12A–12C may include hardware and/or software for managing the mapping of file IDs to blocks within the storage, for object-based embodiments. In yet another alternative, storages 12A–12C may be block-based storages with software providing the object-based interface. The software may operate on the metadata server (or a combination of the metadata server and the storages), on the client (or a combination of the client and the storages), or on any combination of the metadata server, the client, and the storages.

Gateway 16 may be a computer system bridging from interconnect 20 to other networks 18A–18B. The other networks 18A–18B may be any form of network (e.g. the Internet, intranets, etc.). Additionally, one or more of the other networks may be networks interconnected by interconnect 20.

It is noted that clients 10A–10C, metadata server 14, object-based storages 12A–12C, and gateway 16 may each have independent connections to interconnect 20. Each of clients 10A–10C, metadata server 14, object-based storages 12A–12C, and gateway 16 may transmit messages to any other device connected to interconnect 20. Interconnect 20 may route the messages to the addressed device on interconnect 20.

Numerous variations and modifications will become apparent to those skilled in the art once the above disclosure is fully appreciated. It is intended that the following claims be interpreted to embrace all such variations and modifications.

What is claimed is:

1. A data storage system comprising:
    a client computer system configured to transmit a first data write request and a second data write request;
    a first storage device coupled to said client computer system, wherein said first storage device is configured to transmit a sequence number in response to receiving said first data write request;
    a second storage device coupled to said client computer system, wherein said second storage device is configured to receive said second data write request;
    wherein said client computer system is configured to transmit said second data write request including said sequence number;
    wherein said second storage device includes a counter and is configured to compare a current counter value to said sequence number;
    wherein said second storage device is further configured to store data bytes corresponding to said second data write request in response to detecting a first predetermined relationship between said current counter value and said sequence number;
    wherein said second storage device is further configured to increment said counter in response to storing said data bytes corresponding to said second data write request;
    wherein said first predetermined relationship is characterized by said current counter value being equal to said sequence number.

2. The data storage system as recited in claim 1, wherein said second storage device is further configured to discard said data bytes corresponding to said second data write request in response to detecting a second predetermined relationship between said current counter value and said sequence number.

3. The data storage system as recited in claim 2, wherein said second predetermined relationship is characterized by said current counter value being larger than said sequence number.

4. The data storage system as recited in claim 3, wherein said second storage device is further configured to store data bytes corresponding to a premature second data write request and to store a premature sequence number and a byte range of said data bytes corresponding to said premature second data write request in a record in response to detecting a third predetermined relationship between said current counter value and said sequence number.

5. The data storage system as recited in claim 4, wherein said third predetermined relationship is characterized by said current counter value being less than said sequence number.

6. The data storage system as recited in claim 5, wherein said second storage device is further configured to discard data bytes corresponding to a third data write request which overlap said data bytes corresponding to said premature second data write request in response to detecting a fourth predetermined relationship between said current counter value and a sequence number associated with said third data write request and in response to detecting a fifth predetermined relationship between a sequence number associated with said third data write request and said premature sequence number associated with said premature second data write request.

7. The data storage system as recited in claim 6, wherein said fourth predetermined relationship is characterized by said current counter value being smaller than said sequence number associated with a third data write request.

8. The data storage system as recited in claim 6, wherein said fifth predetermined relationship is characterized by said sequence number associated with said third data write request being smaller than said premature sequence number.

9. The data storage system as recited in claim 8, wherein said second storage device is further configured to increment said counter in response to receiving said second data write request and detecting said first predetermined relationship between said current counter value and said sequence number, wherein said second data write request contains zero data bytes.

10. The data storage system as recited in claim 9, wherein said second storage device is further configured to transmit said current counter value to said client computer system in response to storing said data bytes corresponding to said second data write request.

11. The data storage system as is recited in claim 1, wherein said first storage device is further configured to transmit said sequence number to said client computer system in response to receiving a first read data request from said client computer system.

12. The data storage system as recited in claim 11, wherein client computer system is further configured to retransmit a second read data request in response to detecting a first predetermined relationship between said current counter value received from said second storage device and said sequence number received from said first storage device.

13. The data storage system as recited in claim 12, wherein said first predetermined relationship is characterized by said current counter value received from said second storage device being smaller than said sequence number received from said first storage device.

14. The data storage system as recited in claim 1, wherein said second data write request is a request to write a mirrored copy of data written in said first data write request.

15. The data storage system as recited in claim 1, wherein each of said first data write request and said second data write request are requests to write a portion of a stripe of data.

16. A method of operating a data storage system including a client computer system, a first storage device coupled to said client computer system and a second storage device coupled to said client computer system, said method comprising:
   receiving a first data write request;
   transmitting a sequence number in response to receiving said first data write request;
   receiving a second data write request including said sequence number;
   comparing a current counter value to said sequence number;
   storing data bytes corresponding to said second data write request in response to detecting a first predetermined relationship between said current counter value and said sequence number;
   incrementing said counter in response to storing said data bytes corresponding to said second data write request;
   wherein said first predetermined relationship is characterized by said current counter value being equal to said sequence number.

17. The method as recited in claim 16 further comprising discarding said data bytes corresponding to said second data write request in response to detecting a second predetermined relationship between said current counter value and said sequence number.

18. The method as recited in claim 17, wherein said second predetermined relationship is characterized by said current counter value being larger than said sequence number.

19. The method as recited in claim 18 further comprising storing data bytes corresponding to a premature second data write request and storing a premature sequence number and a byte range of said data bytes corresponding to said premature second data write request in a record in response to detecting a third predetermined relationship between said current counter value and said sequence number.

20. The method as recited in claim 19, wherein said third predetermined relationship is characterized by said current counter value being less than said sequence number.

21. The method as recited in claim 20 further comprising discarding data bytes corresponding to a third data write request which overlap said data bytes corresponding to said premature second data write request in response to detecting a fourth predetermined relationship between said current counter value and a sequence number associated with said third data write request and in response to detecting a fifth predetermined relationship between a sequence number associated with said third data write request and said premature sequence number associated with said premature second data write request.

22. The method as recited in claim 21, wherein said fourth predetermined relationship is characterized by said current counter value being smaller than said sequence number associated with said third data write request.

23. The method as recited in claim 21, wherein said fifth predetermined relationship is characterized by said sequence number associated with said third data write request being smaller than said premature sequence number associated with said premature second data write request.

24. The method as recited in claim 22, further comprising incrementing said counter in response to receiving said second data write request and detecting said first predetermined relationship between said current counter value and said sequence number, wherein said second data write request contains zero data bytes.

25. The method as recited in claim 24 further comprising transmitting said current counter value in response to storing said data bytes corresponding to said second data write request.

26. The method as recited in claim 1 further comprising transmitting said sequence number in response to receiving a first read data request.

27. The method as recited in claim 26 further comprising transmitting said current counter value in response to receiving a second read data request.

28. The method as recited in claim 27 further comprising retransmitting said second read data request in response to detecting a first predetermined relationship between said current counter value received and said sequence number received.

29. The method as recited in claim 28, wherein said first predetermined relationship is characterized by said current counter value being smaller than said sequence number.

30. The method as recited in claim 16, wherein said second data write request is a request to write a mirrored copy of data written in said first data write request.

31. The method as recited in claim 16, wherein each of said first data write request and said second data write request are requests to write a portion of a stripe of data.

32. A data storage system comprising:
   a client computer system configured to transmit a first data read request and a second data read request;
   a first storage device coupled to said client computer system, wherein said first storage device is configured to transmit a sequence number in response to receiving said first data read request;
   a second storage device coupled to said client computer system, wherein said second storage device is configured to transmit a current counter value in response to receiving said second read data request;
   wherein said second storage device includes a counter and is configured to generate said current counter value;
   wherein said client computer system is further configured to retransmit said second read data request in response to detecting a first predetermined relationship between said current counter value received and said sequence number received;
   wherein said first predetermined relationship is characterized by said current counter value received being smaller than said sequence number received.

* * * * *

UNITED STATES PATENT AND TRADEMARK OFFICE
CERTIFICATE OF CORRECTION

PATENT NO. : 6,745,285 B2  Page 1 of 1
DATED : June 1, 2004
INVENTOR(S) : Howard et al.

It is certified that error appears in the above-identified patent and that said Letters Patent is hereby corrected as shown below:

<u>Column 10,</u>
Line 56, please change "as is recited" to -- as recited --.

<u>Column 12</u>
Line 10, please change "claim 22" to -- claim 23 --.
Line 21, please change "claim 1" to -- claim 16 --.

Signed and Sealed this

Fourteenth Day of September, 2004

JON W. DUDAS
*Director of the United States Patent and Trademark Office*